US012761939B2

(12) United States Patent
Chanda et al.

(10) Patent No.: US 12,761,939 B2
(45) Date of Patent: Oct. 13, 2026

(54) SECURE PROCESSING IN A DATA TRANSFORM ACCELERATOR

(71) Applicant: MAXLINEAR, INC., Carlsbad, CA (US)

(72) Inventors: Pinaki Shankar Chanda, San Diego, CA (US); Michael Ray Ham, San Jose, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 18/437,221

(22) Filed: Feb. 8, 2024

(65) Prior Publication Data

US 2024/0273031 A1 Aug. 15, 2024

Related U.S. Application Data

(60) Provisional application No. 63/484,461, filed on Feb. 10, 2023.

(51) Int. Cl.
*G06F 12/10* (2016.01)
*G06F 9/455* (2018.01)

(52) U.S. Cl.
CPC .......... *G06F 9/45558* (2013.01); *G06F 12/10* (2013.01); *G06F 2009/45575* (2013.01); *G06F 2009/45583* (2013.01); *G06F 2009/45587* (2013.01); *G06F 2212/251* (2013.01)

(58) Field of Classification Search
CPC .. G06F 9/45558; G06F 12/0246; G06F 12/10; G06F 2212/7201; G06F 3/0622; G06F 2212/2022
USPC ......... 711/202, 206, 128, E12.002, E12.061, 711/170, E12.001, E12.008
See application file for complete search history.

(56) References Cited

U.S. PATENT DOCUMENTS

2017/0351758 A1* 12/2017 Antic .................. G06F 21/6245
2021/0218417 A1* 7/2021 Indeck .............. G06F 16/24544
2024/0272925 A1 8/2024 Chanda et al.

OTHER PUBLICATIONS

International Search Report and Written Opinion for PCT Application No. PCT/US2024/015264 mailed May 15, 2024, 16 pgs.
International Search Report and Written Opinion for PCT Application No. PCT/US2024/015268 mailed May 15, 2024, 19 pgs.

* cited by examiner

*Primary Examiner* — Jared I Rutz
*Assistant Examiner* — Edward Waddy, Jr.
(74) *Attorney, Agent, or Firm* — Buchalter; Jason W. Croft

(57) ABSTRACT

A method includes obtaining an address associated with a data transform command. The address may be disposed in a container located in a first memory. The method also includes obtaining metadata associated with the data transform command. The data transform command may be disposed in the first memory and may be pointed to by the address. A first portion of the metadata may be public data and a second portion of the metadata may be sensitive data. The method further includes storing the public data in the first memory and the sensitive data in a second memory disposed internally to a data transform accelerator. The method also includes configuring a data transform pipeline in the data transform accelerator based on the public data in the first memory and the sensitive data in the second memory.

20 Claims, 7 Drawing Sheets

SECURE PROCESSING IN A DATA TRANSFORM ACCELERATOR

CROSS REFERENCE TO RELATED APPLICATIONS

This U.S. patent application claims priority to U.S. Provisional Patent Application No. 63/484,461, titled "SECURE PROCESSING FOR A DATA TRANSFORM ACCELERATOR," and filed on Feb. 10, 2023, the disclosure of which is hereby incorporated by reference in its entirety.

TECHNICAL FIELD

This disclosure generally relates to data transform acceleration, and more specifically, to secure processing of data in a data transform accelerator.

BACKGROUND

Unless otherwise indicated herein, the materials described herein are not prior art to the claims in the present application and are not admitted to be prior art by inclusion in this section.

Data transform accelerators are co-processor devices that are used to accelerate data transform operations for various applications such as data analytics applications, big data applications, storage applications, cryptographic applications, and networking applications. For example, a data transform accelerator can be configured as a storage accelerator and/or a cryptographic accelerator.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example embodiment, a method may include obtaining an address associated with a data transform command. The address may be disposed in a container located in a first memory. The method also includes obtaining metadata associated with the data transform command. The data transform command may be disposed in the first memory and may be pointed to by the address. The data transform command may include a transform command description and/or other metadata, such as, but not limited to, descriptors that point to additional metadata for a data transform operation as well as serves as pointer to source data buffers and/or destination data buffers. A first portion of the metadata may be public data and a second portion of the metadata may be sensitive data. The method further includes storing the public data in the first memory and the sensitive data in a second memory disposed internally to a data transform accelerator. The method also includes configuring a data transform pipeline in the data transform accelerator based on the data transform command and/or associated metadata including the metadata exposed as the public data in the first memory and the sensitive data in the second memory.

The objects and advantages of the embodiments will be realized and achieved at least by the elements, features, and combinations particularly pointed out in the claims.

Both the foregoing general description and the following detailed description are given as examples and are explanatory and not restrictive of the invention, as claimed.

DESCRIPTION OF DRAWINGS

Example implementations will be described and explained with additional specificity and detail using the accompanying drawings in which.

DETAILED DESCRIPTION

A data transform accelerator may be used as a coprocessor device in conjunction with a host device to accelerate data transform operations for various applications, such as data analytics, big data, storage, and/or networking applications. The data transform operations may include, but not be limited to, compression, decompression, encryption, decryption, authentication tag generation, authentication, data deduplication, non-volatile memory express (NVMe) protection information (PI) generation, NVMe PI verification, and/or real-time verification.

In some circumstances, data transmitted to the data transform accelerator and/or data generated by the data transform accelerator may be sensitive data or private data (referred to as sensitive data in the present disclosure). As such, maintaining a limited access to the sensitive data may be beneficial and/or desirable, including limiting access to the sensitive data during the performance of the data transform operations by the data transform accelerator.

In some embodiments of the present disclosure, a data transform accelerator may include memory that may include at least a partition thereof configured to store sensitive data. In some embodiments, the sensitive data may be stored separate from non-sensitive (or public) data and/or the access to the sensitive data may be limited. For example, in some embodiments, the sensitive data may be accessible by an internal processor of the data transform accelerator and may not be accessible by an external processor, such as a processor associated with a host device configured to communicate with the data transform accelerator.

In some embodiments, the sensitive data may be obtained by the data transform accelerator, such as transmitted from the host device and/or other external devices. Alternatively, or additionally, the sensitive data may be generated by the data transform accelerator (e.g., as part of data transform operations performed by the data transform accelerator). In these and other embodiments, the data transform accelerator may be configured to store and limit access to the sensitive data, as described herein. As such, the data transform accelerator (and associated components included therein) may be configured to limit access to the sensitive data obtained and/or generated by the data transform accelerator from other processors and/or devices.

Figure 1:
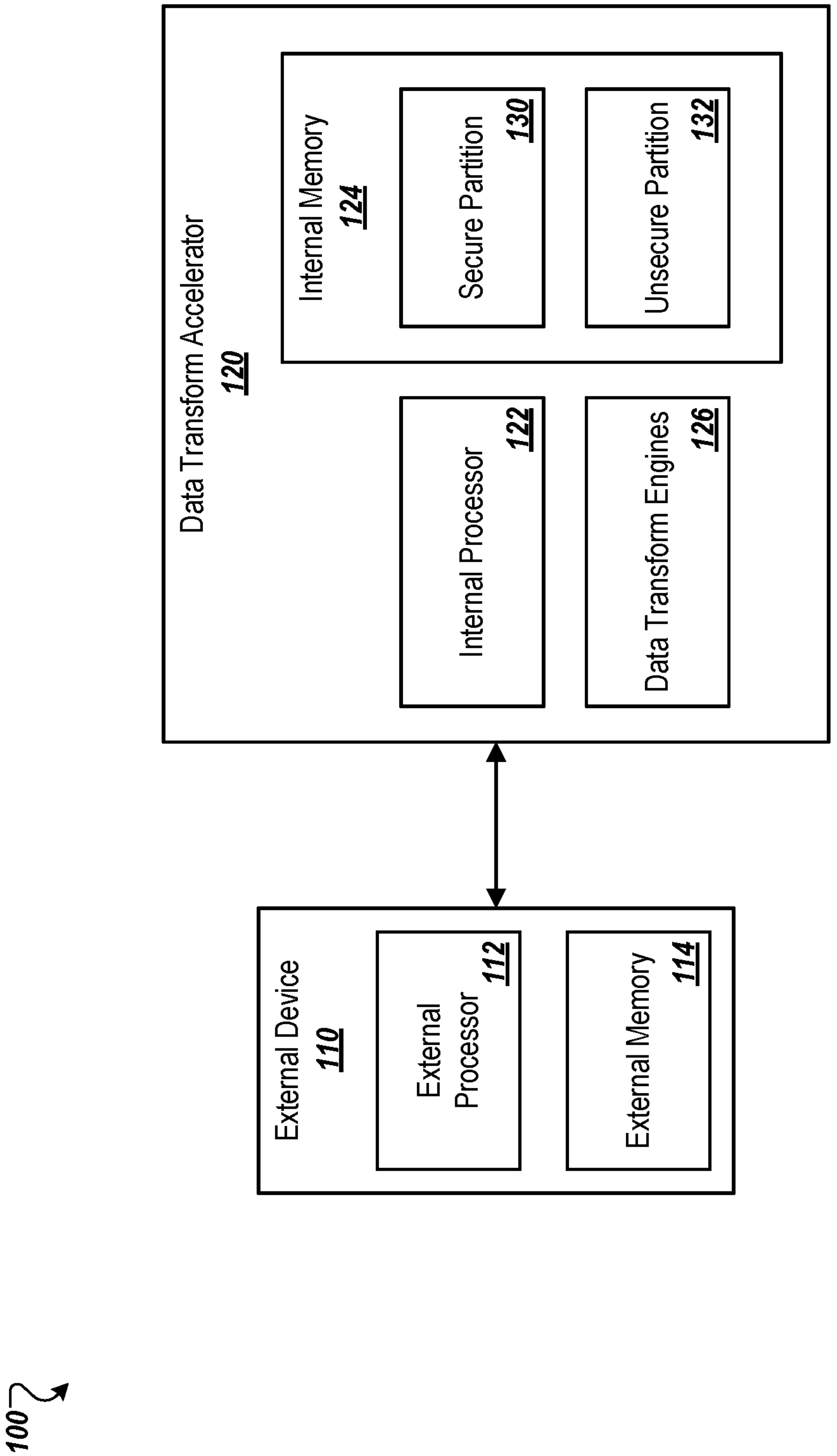
FIG. 1 illustrates a block diagram of an example operating environment for secure processing of data in a data transform accelerator.

FIG. 1 illustrates a block diagram of an example operating environment 100 for secure processing of data in a data transform accelerator 120, in accordance with at least one embodiment of the present disclosure. The operating environment 100 may include an external device 110 and the data transform accelerator 120. The external device 110 may include an external processor 112 and an external memory 114. The data transform accelerator 120 may include an internal processor 122, an internal memory 124, and data transform engines 126. The internal memory 124 may include a secure partition 130 and an unsecure partition 132.

In some embodiments, the external device 110 (e.g., a host computer, a host server, etc.) may be in communication with the data transform accelerator 120 via a data communication interface (e.g., a Peripheral Component Interconnect express (PCIe) interface, a Universal Serial Bus (USB) interface, and/or other similar data communication interfaces). In some embodiments, upon a request by a user to transform source data that may be located in the external memory 114, software (e.g., a software driver) on the external device 110 and operated by the external processor 112 may be directed to generate metadata (such as, but not limited to, transform command pre-data including a command description, a list of descriptors dereferencing a different section of the metadata, and a list of descriptors dereferencing source data and destination data buffers, command pre-data including transform algorithms and associated parameters, source and action tokens describing different sections of the source data and transform operations to be applied to different sections, and additional command metadata) with respect to transforming the source data in the external memory 114. In some embodiments, the software may generate the metadata in the external memory 114 based on the source data that may be obtained from one or more sources. For example, the source data may be obtained from a storage associated with the external device 110 (e.g., a storage device), a buffer associated with the external device 110, a data stream from another device, etc. In these and other embodiments, obtaining the source data may include copying or moving the source data to the external memory 114.

In some embodiments, the software may direct the external processor 112 to generate the metadata associated with the source data. In some embodiments, the metadata may be stored in one or more input buffers. For example, in instances in which the metadata includes a transform command that may contain a list of source descriptors, destination descriptors, command pre-data, source and action tokens, and additional command metadata, each of the individual components of the metadata may be stored in individual input buffers (e.g., the transform command in a first input buffer, pre-data in the second input buffer, the source and action tokens in the third input buffer, and so forth). In some embodiments, the input buffers associated with the metadata may be located in the external memory 114. Alternatively, or additionally, the input buffers associated with the metadata may be located in the internal memory 124. Alternatively, or additionally, the input buffers may be located in both the external memory 114 and the internal memory 124. For example, one or more input buffers associated with the metadata may be located in the external memory 114 and one or more input buffers associated with the metadata may be located in the internal memory 124. In these and other embodiments, the external processor 112 may direct the software to reserve one or more output buffers that may be used to store an output from the data transform accelerator 120. In some embodiments, the output buffers may be located in the external memory 114. In some embodiments, the output buffers may be located in the internal memory 124 of the data transform accelerator 120.

In instances in which the software directs the external processor 112 to generate the metadata and store the metadata in the internal memory 124 (e.g., in the input buffers located in the internal memory 124), the external processor 112 may transmit commands to the data transform accelerator 120 (e.g., such as to a component of the data transform accelerator 120, such as the internal processor 122 or the unsecure partition 132 of the internal memory 124) via the data communication interface. For example, the unsecure partition 132 of the internal memory 124 may be accessible and/or addressable by the external processor 112 via the data communication interface, and, in instances in which the data communication interface is PCIe, the unsecure partition 132 of the internal memory 124 may be mapped to an address space of the external device 110 using a base address register associated with an endpoint of the PCIe (e.g., the data transform accelerator 120).

In some embodiments, a first portion of the metadata may be public data and a second portion of the metadata may be sensitive data. The public data may be data that may be accessed by one or more devices remote from the data transform accelerator 120, such as the external device 110 (e.g., the external processor 112) and/or accessed by the data transform accelerator 120 (e.g., the internal processor 122). The sensitive data may be data that may be accessed by the internal processor 122 of the data transform accelerator 120 and/or other components included in the data transform accelerator 120 (e.g., the data transform engines 126) and may not be accessed by one or more devices remote from the data transform accelerator 120, such as the external processor 112. For example, in instances in which the external processor 112 attempts to access the sensitive data, the internal processor 122 may return an error, obfuscated random data, and/or may provide an indication to the external device 110 (e.g., the external processor 112) that the sensitive data located in the secure partition 130 may not be accessed and/or may be accessed by the internal processor 122.

In these and other embodiments, the public data may be stored in the unsecure partition 132 of the internal memory 124 and/or in the external memory 114. For example, the public data may be wholly stored in the external memory 114, wholly stored in the unsecure partition 132, or a first portion of the public data may be stored in the external memory 114 and a second portion of the public data may be stored in the unsecure partition 132. Alternatively, or additionally, the sensitive data may be stored in the secure partition 130 of the internal memory 124. In these and other embodiments, the internal memory 124 may be partitioned such that the secure partition 130 and the unsecure partition 132 may be contiguous. Alternatively, or additionally, the internal memory 124 may be partitioned such that the secure partition 130 and the unsecure partition 132 may not be contiguous. In some embodiments, the internal memory 124 may be divided into more partitions than illustrated in FIG. 1, where at least one partition may be the secure partition 130.

The partitioning of the internal memory 124 into at least the secure partition 130 and the unsecure partition 132 may be performed using one or more partitioning techniques. In some embodiments, the secure partition 130 may be hard-wired in the internal memory 124 of the data transform accelerator 120. In some embodiments, one or more eFuse bits on the data transform accelerator 120 may be set to enable partitioning of the internal memory 124. The internal memory 124 may be partitioned into one or more predefined sizes by enabling and/or disabling the eFuse bits in the data transform accelerator 120.

In some embodiments, the internal processor 122 may execute a secure boot read-only memory (ROM) code (e.g., a primary boot ROM or a secondary boot ROM) that may cause the secure partition 130 to be generated in the internal memory 124. Alternatively, or additionally, the internal processor 122 may obtain a secure runtime firmware that may be used to enable the partitioning of the internal memory 124. In some embodiments, the secure runtime firmware may be authenticated by a secure boot ROM code that may be executed by the internal processor 122.

In some embodiments, the internal processor 122 may obtain a command from software in a portion of the external device 110 (e.g., a trusted region), from trusted software in the external processor 112, trusted code, and/or from a trusted application, collectively referred to as a trusted source, where the command may direct the internal processor 122 to configure the secure partition 130 in the internal memory 124. For example, the command could be from the software that may be rooted to a chain of trust using a trusted platform module (TPM). In such instances, the internal processor 122 may receive and/or validate the command from the trusted source and subsequently establish the secure partition 130 in the internal memory 124.

In some embodiments, the trusted source (e.g., trusted software in the external processor 112) may direct the partitioning of the internal memory 124 to include the secure partition 130 after an initialization of the data transform accelerator 120 and/or the trusted source may define the partition to be operable until a threshold may be satisfied, such as a data transform accelerator 120 reset or reboot. In some embodiments, the trusted source may be configured to update the partition and/or obfuscation of the secure partition 130 prior to establishing a session with the data transform accelerator 120. Alternatively, or additionally, the trusted source may be configured to adjust the partition and/or obfuscation of the secure partition 130 dynamically via communications with the internal processor 122. The dynamic adjustment to the partition may be performed prior to the transmission of commands to the secure partition 130 of the internal memory 124. Alternatively, or additionally, other partitioning techniques than those described herein may be used to establish the secure partition 130 in the internal memory 124.

In some embodiments, the software may direct the data transform accelerator 120 to process a data transform command. For example, the software may direct the data transform accelerator 120 to obtain an address that may point to the data transform command. In some embodiments, the data transform command may be used by the data transform accelerator 120 to transform the source data based on data transform operations included in the data transform command. In some embodiments, the data transform operations that may be performed as directed by the data transform command may be performed by the data transform engines 126. In some embodiments, the data transform engines 126 may be arranged according to the data transform command and/or the metadata (e.g., the public data in the external memory 114 and/or the unsecure partition 132 of the internal memory 124, and/or the sensitive data in the secure partition 130 of the internal memory 124), such that the data transform engines 126 form a data transform pipeline that may be configured to perform the data transform operations to the source data.

In some embodiments, the address and/or the data transform command may be located in the external memory 114. In such instances, the data transform accelerator 120 (e.g., the internal processor 122) may obtain the address and/or may access the data transform command in the external memory 114 using the data communication interface. Alternatively, or additionally, the address and/or the data transform command may be located in the internal memory 124, such as in the unsecure partition 132, and the address may be obtained by the internal processor 122 and/or the data transform engines 126.

In these and other embodiments, external device 110 may use the data communication interface to transmit metadata to the data transform accelerator 120, which the internal processor 122 may direct to be stored in the internal memory 124 (e.g., the sensitive data in the secure partition 130 and the public data in the unsecure partition 132) and the internal processor 122 may return the address of the stored metadata to the external processor 112. Alternatively, or additionally, the external device 110 may use the data communication interface to transmit metadata directly (e.g., public data) to the unsecure partition 132 of the internal memory 124 of the data transform accelerator 120. In instances in which the address of the stored metadata in the secure partition 130 (e.g., the sensitive data) is returned to the external processor 112, operations associated with the sensitive data (e.g., read/write) may be performed via the internal processor 122 and/or other internal components of the data transform accelerator 120, such as the data transform engines 126. For example, the external processor 112 may request to read the sensitive data from the secure partition 130 and/or write sensitive data to the secure partition 130 by submitting one or more messages to the internal processor 122 and receiving results (e.g., the sensitive data and/or a confirmation of completion, respectively) from the secure partition 130 of the internal memory 124 via the data communication interface. In some embodiments, the sensitive data transmitted from the external processor 112 to the secure partition 130 of the internal memory 124 by way of the internal processor 122 may be removed from the external device 110 (e.g., removed from the external memory 114) upon a successful transfer (e.g., upon receiving a confirmation from the internal processor 122 that the sensitive data was stored in the secure partition 130). In some embodiment the read, write, and/or removal request of the secure data may be sent by software rooted in a root-of-trust of the external processor 112. In some embodiments, the data communication interface may be a secure connection, which may include encrypted data and/or digital signatures. For example, the data communication interface may include a secure socket layer (SSL) connection, a transport layer security (TLS) connection.

In some embodiments, upon receiving sensitive data for storage in the secure partition 130, the internal processor 122 may perform a verification of the size of the secure partition 130 relative to the size of the sensitive data. In instances in which the sensitive data size is greater than the size of the secure partition 130, the internal processor 122 may return an error to the external processor 112 and/or the internal processor 122 may not store the sensitive data in the secure partition 130 (and/or any other portion of the internal memory 124). Alternatively, or additionally, in instances in which the sensitive data is stored in the secure partition 130, the internal processor 122 may transmit a confirmation to the external processor 112 that the sensitive data was stored.

In some embodiments, data transform operations performed by the data transform engines 126 (e.g., one or more data transform operations performed in the data transform pipeline, as described herein) may produce intermediate data that may be used in subsequent data transform operations (e.g., by a data transform engine configured to perform a subsequent data transform operation using the intermediate data). In some embodiments, the intermediate data may include public data and/or sensitive data. In instances in which the intermediate data is sensitive data, the portion of the intermediate data that is sensitive data may be stored in the secure partition 130. Alternatively, or additionally, in response to the intermediate data being used in a subsequent data transform operation and/or in response to the intermediate data not planned to be used in subsequent data transform operations, the internal processor 122 (and/or other internal components included in the data transform accelerator 122, such as the data transform engines 126) may delete the intermediate data from the secure partition 130.

In some embodiments, the data transform accelerator 120 may be configured to support multiple data transform sessions, where a data transform session may include source data, associated metadata (e.g., including public data and sensitive data), and the data transform engines 126 (e.g., arranged in a data transform pipeline), as described herein. In some embodiments, one or more data transform commands may include the same or similar algorithms in the data transform operations. In such instances, the individual data transform commands may be grouped together into a data transform session. In some embodiments, the multiple data transform commands grouped into a data transform session may include the same or similar metadata, including the same or similar sensitive data. In such instances, the data transform accelerator 120 may store the sensitive data in the secure partition 130, as described herein, and the data transform accelerator 120 may provide the address to external device 110, such that the external device 110 may include the addresses within the data transform commands belonging to the session. In these and other embodiments, one or more source descriptors may be included in the multiple data transform commands that may point to one or more input buffers that may be configured to store the secure and/or unsecure metadata shared across multiple commands in a session. Alternatively, or additionally, the multiple data transform commands may include one or more source descriptors that may point one or more input buffers that may be configured to store the source data and other secure metadata and unsecure metadata that may be unique to different commands of the session. In instances in which a first data transform command and a second data transform command have the same input data and/or metadata, the corresponding source descriptors may point to the same input buffer(s). In instances in which the first data transform command and the second data transform command have different input data and/or metadata, the corresponding source descriptors may point to different input buffers, as applicable.

For example, a first data transform session may include a first data transform command that may include first source data in a first input buffer and associated first metadata where the first public data may be stored in a second input buffer in the unsecure partition 132 of the internal memory 124 and the first secure data may be stored in a third input buffer in the secure partition 130 of the internal memory 124, and one or more data transform engines 126 may be arranged in a first data transform pipeline. In instances in which the first data transform pipeline of the first data transform session generates first intermediate data that is sensitive data, the first intermediate data may be stored in an intermediate buffer in the secure partition 130, and may be correlated with the sensitive data of the first metadata in the secure partition 130 of the internal memory 124.

Continuing the example, the first data transform session may include a second data transform command that may include the first source data (stored in the first input buffer) and the first metadata, where the public data may be stored in the second input buffer in the unsecure partition 132 and the sensitive data may be stored in the third input buffer the secure partition 130. Alternatively, or additionally, the second data transform command may utilize the shared source data and/or shared metadata to perform the data transform operations. In the examples, the first data transform command and the second data transform command may include the same source descriptors as the first data transform command and the second data transform command may use the same source data and/or metadata stored in respective input buffers.

In an example, the external processor 112 may transmit a communication (e.g., a command) to the internal processor 122 using the data communication interface. The command may direct the internal processor 122 to establish one or more input buffers and/or one or more output buffers in the internal memory 124 (e.g., which may include in the secure partition 130 and/or the unsecure partition 132). In some embodiments, the commands may be transmitted from a trusted region of the external processor 112, and/or the transmission may be performed using a secure connection (e.g., encryption, digital signature, etc.) via the data communication interface.

In response to receiving the command, the internal processor 122 may establish the one or more buffers and the internal processor 122 may return the individual addresses of the one or more buffers to the external processor 112. In such instances, secure addresses associated with the secure partition 130 may be used by the internal processor 122 to read and/or write to the associated buffers, and the secure addresses may not be used by the external processor 112 to read and/or write to the associated buffers.

The external processor 112 may generate one or more source descriptors that may be associated with a data transform command and that may point to one or more input buffers. The data transform command may be used to establish a data transform pipeline and/or perform a data transform operation to the source data. In some embodiments, individual source descriptors may be associated with the individual components of the metadata, which may include the sensitive data. The input buffers may be used to store the inputs to the data transform accelerator 120, and the input buffers may be pointed to by the source descriptors. In some embodiments, the software on the external device 110 may generate source data and/or associated metadata and the external processor 112 may direct the source data and/or the associated metadata to be stored in the one or more input buffers, which may be located in the external memory 114 and/or the internal memory 124 (e.g., the secure partition 130 and/or the unsecure partition 132).

The metadata associated with source data may be stored in the external memory 114 and/or may be transmitted from the external device 110 to the data transform accelerator 120 to be stored in the internal memory 124. In instances in which the metadata include sensitive data, the sensitive data may be transmitted from the external device 110 to the data transform accelerator 120 and for storage in the secure partition 130 of the internal memory 124. The internal processor 122 may determine if the secure partition 130 includes enough memory to store the sensitive data. In instances in which the sensitive data uses more memory than the secure partition 130 has available, the internal processor 122 may return an error to the external device 110 (e.g., the external processor 112) and the internal processor 122 may not store the sensitive data in the internal memory 124. Alternatively, or additionally, in instances in which the sensitive data uses less memory than the secure partition 130 has available (or an equal amount of memory), the internal processor 122 may direct the sensitive data to be stored in the secure partition 130 of the internal memory 124. In such instances, the internal processor 122 may return the address of the sensitive data within the secure partition 130 to the software of the external device 110 (e.g., the external processor 112 running the software). Alternatively, or additionally, in response to obtaining an indication that the sensitive data is stored in the secure partition 130, the external processor 112 may direct the removal of the sensitive data from the external memory 114 of the external device 110. Alternatively, or additionally, the sensitive data can be removed from the secure partition 130 by the data transform engines 126 on completion of the command.

Alternatively, or additionally, the external processor 112 may generate one or more destination descriptors that may be associated with the data transform command and that may point to one or more output buffers. The output buffers may be used to store the output from the data transform accelerator 120 and/or the intermediate data that may be generated during the data transform operation (e.g., sensitive data that may be generated during the data transform operation and stored in an intermediate/output buffer in the secure partition 130). For example, the software may reserve the external memory 114 and/or direct the internal processor 122 in the data transform accelerator 120 to configure the internal memory 124 to reserve at least a portion of memory for one or more output buffers that may be used to store the output from the data transform operations.

In some embodiments, the external processor 112 may direct an address associated with the data transform command to be stored in a container located in the external memory 114 and/or the internal memory 124 (e.g., the unsecure partition 132). In some embodiments, the data transform accelerator 120 may obtain the address from the container, and the data transform accelerator 120 may dereference the source descriptors to obtain the metadata (e.g., both public data and sensitive data). Using the metadata, the data transform accelerator 120 (e.g., the internal processor 122) may configure the data transform engines 126 into a data transform pipeline and may obtain one or more algorithms that may be used in the data transform operation. For example, the various components of the metadata (e.g., command metadata, command pre-data, additional command metadata) may provide algorithm parameters, source tokens (e.g., input data types and/or input data lengths), action tokens (e.g., locations within the data and/or application of the algorithms to the data at the determined locations), and the like.

In response to obtaining the address, the data transform accelerator 120 (e.g., the data transform engines 126) may access portions of the internal memory 124, such as the secure partition 130 thereof. In instances in which the data transform engines 126 read the secure partition 130 and the read operation extends beyond the boundaries of the secure partition 130, the data transform engines 126 may generate an error and/or transmit the error to the external device 110 and the data transform engines 126 may stop the performance of the data transform operations.

The data transform accelerator 120 may obtain input data and may perform the data transform operations to the input data using the data transform engines 126 and the data transform pipeline. Following the data transform operations, the data transform accelerator 120 may output the transformed data into the output buffers as indicated by the destination descriptors. In instances in which the data transform operations generate sensitive data, the data transform engines 126 may direct the storage of the sensitive data in intermediate buffers in the secure partition 130 of the internal memory 124. Alternatively, or additionally, in instances in which the intermediate data is larger than the secure partition, the data transform accelerator 120 (e.g., the data transform engines 126) may generate an error and/or transmit the error to the external device 110 and may direct the intermediate data to not be stored in the secure partition 130.

Modifications, additions, or omissions may be made to the operating environment 100 without departing from the scope of the present disclosure. For example, the designations of different elements in the manner described is meant to help explain concepts described herein and is not limiting. Further, the operating environment 100 may include any number of other elements or may be implemented within other systems or contexts than those described. For example, any of the components of FIG. 1 may be divided into additional or combined into fewer components.

Figure 2:
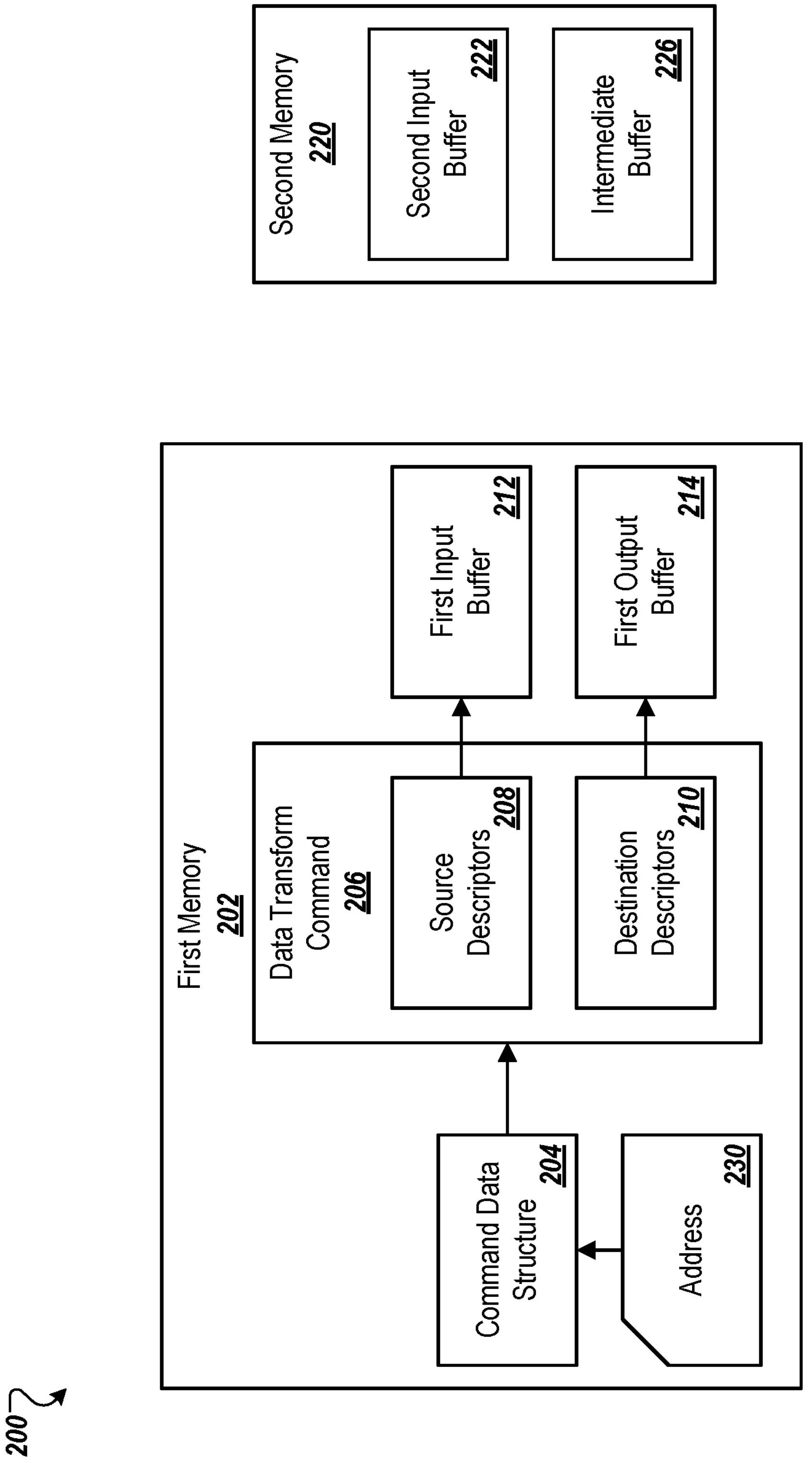
FIG. 2 illustrates a block diagram of an example environment for operations associated with secure processing of data in a data transform accelerator.

FIG. 2 illustrates a block diagram of an example operating environment 200 for secure processing of data in a data transform accelerator, in accordance with at least one embodiment of the present disclosure. The operating environment 200 may include a first memory 202 and a second memory 220. The first memory 202 may include a command data structure 204, a data transform command 206, a first input buffer 212, and a first output buffer 214. The data transform command 206 may include source descriptors 208 and destination descriptors 210. The second memory 220 may include a second input buffer 222, and an intermediate buffer 226.

In some embodiments, the first memory 202 may be the same or similar as the external memory 114, or the unsecure partition 132 of the internal memory 124, as illustrated and/or described relative to FIG. 1. Alternatively, or additionally, the second memory 220 may be the same or similar as the secure partition 130 of the internal memory 124, as illustrated and/or described relative to FIG. 1.

In some embodiments, software in an external device (e.g., the external device 110 of FIG. 1) may direct a data transform accelerator (e.g., the data transform accelerator 120 of FIG. 1) to obtain an address 230 from the first memory 202. In some embodiments, the software may direct the address 230 to be stored in the command data structure 204 and the data transform accelerator to obtain the address 230 from the command data structure 204. In some embodiments, the command data structure 204 may include one or more addresses, where individual addresses may correspond to individual data transform commands (e.g., the address 230 may correspond to the data transform command 206). In some embodiments, the address 230 may point to the data transform command 206.

In some embodiments, the data transform accelerator may use the address 230 pointing to the data transform command 206 to obtain the source descriptors 208 and/or the destination descriptors 210 included in the data transform command 206. Alternatively, or additionally, the data transform accelerator may obtain source data (e.g., as described relative to FIG. 1) and metadata using the source descriptors 208. In some embodiments, the metadata may include public data and/or sensitive data, where the public data may be stored in the first memory 202 and the sensitive data may be stored in the second memory 220.

In some embodiments, the data transform accelerator may monitor the command data structure 204 to detect the address 230 associated with the data transform command 206. In response to obtaining the address 230, the data transform accelerator may obtain the source data and/or the associated metadata using the source descriptors 208, as described herein, and the data transform accelerator may obtain at least a portion of the source data and/or the associated metadata to be stored in the first memory 202 (e.g., the first input buffer 212). In instances in which the source data and/or the associated metadata includes public data, the public data may be stored in the first memory 202. Alternatively, or additionally, in instances in which the source data and/or the associated metadata includes sensitive data, the sensitive data may be stored in the second memory 220 (e.g., the second input buffer 222).

In instances in which data transform operations performed by the data transform accelerator generates intermediate data (e.g., as part of the data transform operations) that may be sensitive data, the data transform accelerator may direct the intermediate data to be stored in the second memory 220, such as in the intermediate buffer 226. In some embodiments, the intermediate data may remain in the intermediate buffer 226 during the performance of the data transform operation that caused the intermediate data to be generated. In some embodiments, the intermediate data may be deleted from the intermediate buffer 226 upon completion of the data transform operation, and/or in response to the data transform operation providing an indication that the intermediate data may not be used in subsequent operations associated with the data transform operation.

In these and other embodiments, the first memory 202 may store the public data and/or components associated with data transform operations, such as the command data structure 204, the data transform command 206 including the source descriptors 208 and the destination descriptors 210, the first input buffer 212, and the first output buffer 214.

In some embodiments, the first memory 202 may be located in the external device (e.g., the device in communication with the data transform accelerator). Alternatively, or additionally, the first memory 202 may be located in the data transform accelerator. Alternatively, or additionally, a first portion of the first memory 202 (e.g. a first portion of the components illustrated in FIG. 2 as being in the first memory 202) may be located in the external device and a second portion of the first memory 202 (e.g., a second portion of the components illustrated in FIG. 2 as being in the first memory 202) may be located in the data transform accelerator. For example, the command data structure 204 (e.g., including the address 230), and the data transform command 206 (e.g., including the source descriptors 208 and the destination descriptors 210) may be located in the external device and the first input buffer 212 and the first output buffer 214 may be located in the data transform accelerator. Other variations of the locations of the data transform components may be implemented without detracting from the operability of the present disclosure. In these and other embodiments, the second memory 220 may be located in the data transform accelerator such that the data transform accelerator may limit access to the sensitive data that may be stored in the second memory 220.

Modifications, additions, or omissions may be made to the operating environment 200 without departing from the scope of the present disclosure. For example, the designations of different elements in the manner described is meant to help explain concepts described herein and is not limiting. Further, the operating environment 200 may include any number of other elements or may be implemented within other systems or contexts than those described. For example, any of the components of FIG. 2 may be divided into additional or combined into fewer components.

Figure 3:
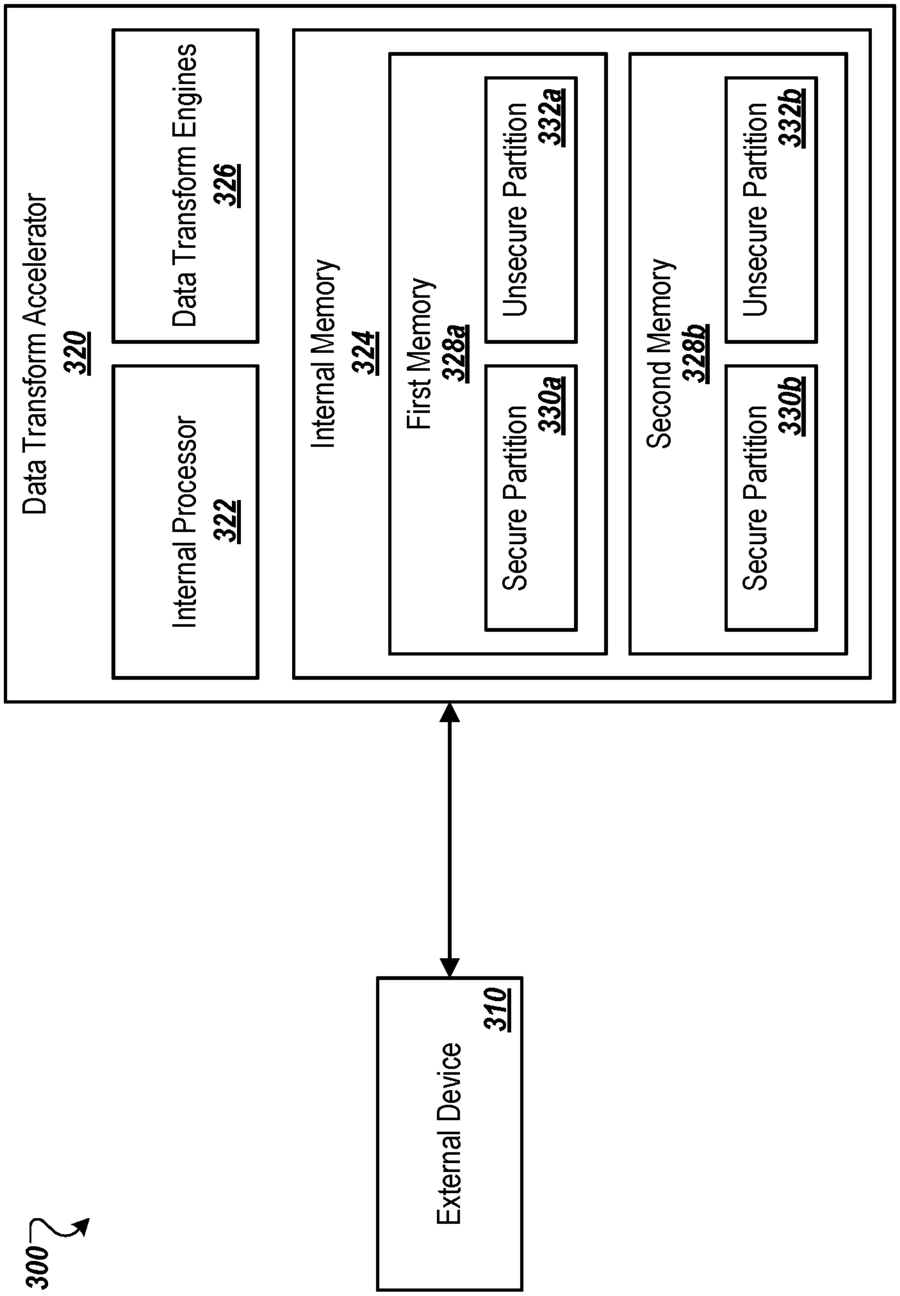
FIG. 3 illustrates a block diagram of an example operating environment for secure processing of data using input/output virtualization in a data transform accelerator.

FIG. 3 illustrates a block diagram of an example operating environment 300 for secure processing of data using virtualization in a data transform accelerator 320, in accordance with at least one embodiment of the present disclosure. The operating environment 300 may include an external device 310 and the data transform accelerator 320. The data transform accelerator 320 may include an internal processor 322, an internal memory 324, and data transform engines 326. The internal memory 324 may include a first memory **328*a* assigned to a first virtual machine (VM) and a second memory 328*b* assigned to second VM, referred to collectively as VM memories 328. The first memory 328*a* may include a first secure partition 330*a* and a first unsecure partition 332*a*, and the second memory 328*b* may include a second secure partition 330*b* and a second unsecure partition 332*b*. The first secure partition 330*a* and the second secure partition 330*b* may be referred to collectively as the secure partitions 330 and the first unsecure partition 332*a* and the second unsecure partition 332*b* may be referred to collectively as the unsecure partitions 332**.

In some embodiments, one or more components included the operating environment 300 may be the same or similar as components included in the operating environment 100 of FIG. 1. For example, the external device 310, the data transform accelerator 320, the internal processor 322, the internal memory 324, and the data transform engines 326 may be the same or similar as the external device 110, the data transform accelerator 120, the internal processor 122, the internal memory 124, and the data transform engines 126, respectively, of FIG. 1. As such, the components included in FIG. 3 that are the same or similar of the components included in FIG. 1 may be configured to perform the same or substantially the same functions and/or operations, unless described otherwise.

In some embodiments, the data transform accelerator 320 may be used when the operating environment 300 is configured to support input/output (IO) virtualization. For example, in instances in which software drivers may run on a virtual machine that may be utilize the data transform accelerator 320, IO virtualization may be supported by the data transform accelerator 320 and/or the components included in the data transform accelerator 320. In some embodiments, the internal memory 324 may be partitioned in conjunction with the VMs supported, such as the first memory **328*a* and the second memory 328*b*** that may support a first VM and a second VM, respectively.

In some embodiments, the internal memory 324 may be partitioned into portions of memory (e.g., the first memory **328*a* and the second memory 328*b*), where each portion of memory may be associated with one or more virtual functions. In some embodiments, each VM may run one or more instances of a software driver that may create one or more sessions. The one or more sessions may be configured to submit commands to the data transform accelerator 320. In some embodiments, each of the one or more sessions may be configured to store the sensitive data and/or public data that corresponds to the VM and/or the software driver that created the one or more session. Although the internal memory 324 is illustrated as including only the first memory 328***a* and the second memory 328*b*, any number of VMs and associated VM memories 328 may be included in the data transform accelerator 320 and/or may be limited by the amount of memory available in the internal memory 324.

In some embodiments, the first memory 328*a* may be configured to perform memory operations in view of the first VM and relative to the data transform accelerator 320 similarly to the interaction between the internal memory 124 relative to the data transform accelerator 120 of FIG. 1. For example, the first secure partition 330*a* may store sensitive data that may be obtained from the external device 310 and/or generated as part of operations of the data transform accelerator 320 and/or the first secure partition 330*a* may limit access to the sensitive data stored therein (e.g., an external processor of the external device 310 may be unable to access the sensitive data in the first secure partition 330*a*, while the internal processor 322 may be able to access the sensitive data). Continuing the example, the first unsecure partition 332*a* may store public data that may be obtained from the external device 310 and/or generated as part of operations of the data transform accelerator 320 and/or the first unsecure partition 332*a* may not limit access to the public data stored therein (e.g., the external processor of the external device 310 and/or the internal processor 322 may be able to access the public data), all with respect to the first VM. The second memory 328*b* may be the same or similar as the first memory 328*a*, with respect to the second VM.

In general, the secure partitions 330 and the unsecure partitions 332 may be the same or similar as the secure partition 130 and the unsecure partition 132, respectively, of FIG. 1. The secure partitions 330 and the unsecure partitions 332 may individually be configured to support one or more virtual functions associated with the respective VMs. For example, first sensitive data and first public data associated with a first virtual function may be stored in the first secure partition 330*a* and the first unsecure partition 332*a*, respectively, second sensitive data and second public data associated with a second virtual function may be stored in the second secure partition 330*b* and the second unsecure partition 332*b*, respectively, and so forth.

In some embodiments, the secure partitions 330 may be partitioned from the unsecure partitions 332 in the respective VM memories 328. In some embodiments, the partitioning of the secure partitions 330 within the VM memories 328 may be accomplished using one or more of the operations described relative to the partitioning of the internal memory 124 of FIG. 1. For example, the partitioning of the VM memories 328 may be accomplished using one or more eFuse bits, hardware included in the data transform accelerator 320, software obtained by the internal processor 322 from a trusted system or device, secure boot Read-Only-Memory (ROM) code, secure runtime firmware, and/or other partitioning techniques described herein.

In some embodiments, each VM may be configured to run one instance of a software driver that may create one or more sessions for submission of commands to the data transform accelerator 320. Alternatively, or additionally, in response to the one or more sessions being created, the corresponding VM memories 328 and associated partitions thereof (e.g., the first secure partition 330*a*, the first unsecure partition 332*a*, etc.) may be established for operations associated with the corresponding VM. In such circumstances, the sensitive data that may be generated or obtained by the data transform accelerator 320 may be stored in the secure partitions 330 of the VM memories 328 in correspondence with the VM. Similarly, the public data that may be generated or obtained by the data transform accelerator 320 may be stored in the unsecure partitions 332 of the VM memories 328 in correspondence with the VM. As such, different portions of the internal memory 324 may be used independently and in parallel based on the software associated with the VMs.

Modifications, additions, or omissions may be made to the operating environment 300 without departing from the scope of the present disclosure. For example, the designations of different elements in the manner described is meant to help explain concepts described herein and is not limiting. Further, the operating environment 300 may include any number of other elements or may be implemented within other systems or contexts than those described. For example, any of the components of FIG. 1 may be divided into additional or combined into fewer components.

Figure 4:
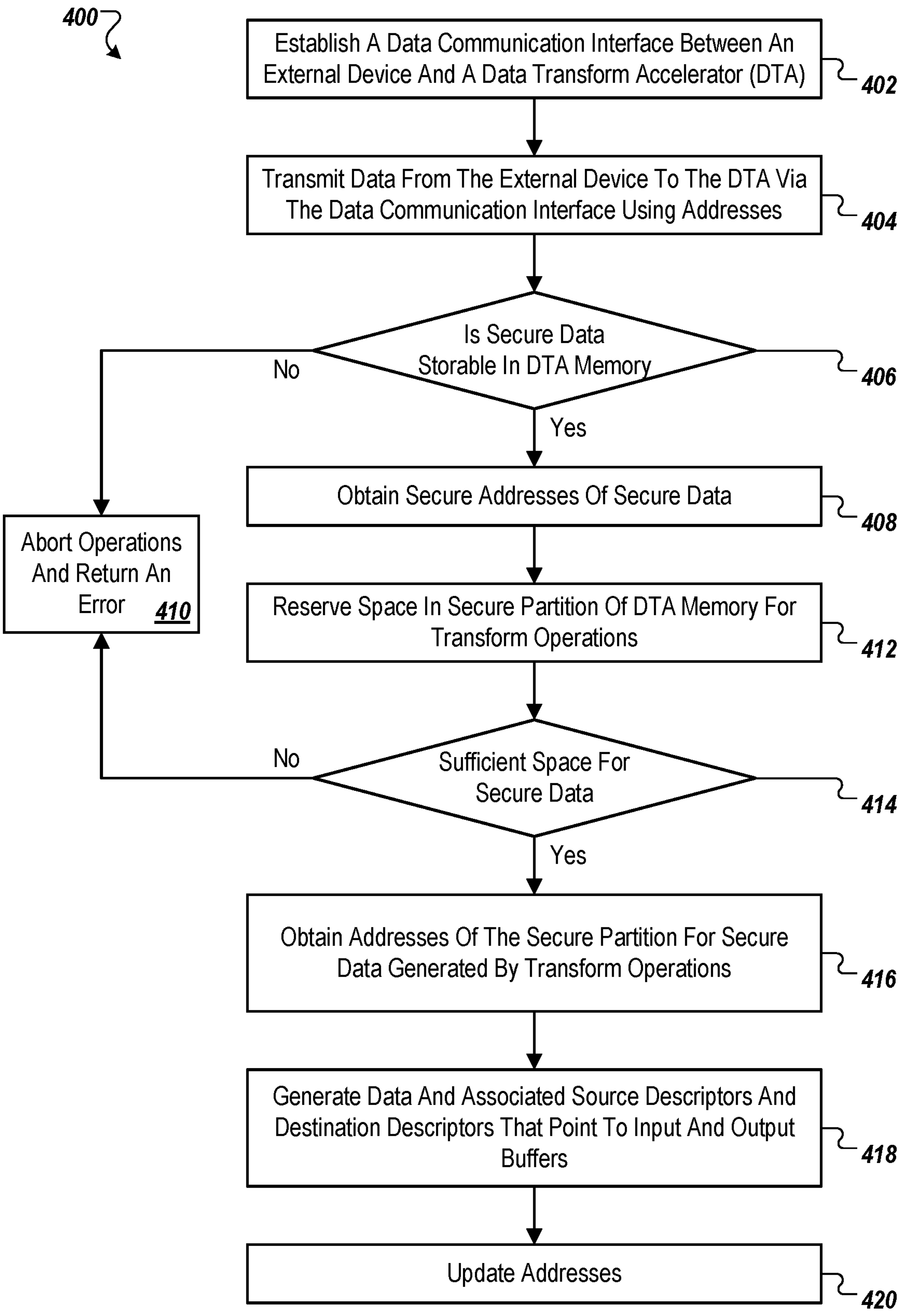
FIG. 4 illustrates a flowchart of an example method of an external device in communications with a data transform accelerator to performing secure processing of data.

FIG. 4 illustrates a flowchart of an example method 400 of an external device in communications with a data transform accelerator to perform secure processing of data, in accordance with at least one embodiment of the present disclosure. The method 400 may be performed by processing logic that may include hardware (circuitry, dedicated logic, etc.), software (such as is run on a general purpose computer system or a dedicated machine), or a combination of both, which processing logic may be included in any computer system or device such as the external device 110 of FIG. 1.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 402, a data communication interface may be established between an external device (e.g., the external device 110 of FIG. 1) and a data transform accelerator (e.g., the data transform accelerator 120 of FIG. 1). In some embodiments, the data communication interface may include secure communications, such as through the use of encrypted data and/or digital signatures. For example, the data communication interface may include a secure socket layer (SSL) connection, a transport layer security (TLS) connection. In some embodiments, the data communication interface may implement the PCIe standard, the USB standard, and/or other similar data communication standards.

In some embodiments, the host device may generate a container that may be configured to store one or more addresses. The addresses may point to a data transform command. In some embodiments, the data transform command may be configured to include one or more references to source descriptors and/or destination descriptors (e.g., the source descriptors and/or the destination descriptors generated by the method 400), which may point to one or more input buffers and/or one or more output buffers, respectively.

At block 404, the host device may transmit data to the data transform accelerator. In some embodiments, the data may include sensitive data which the data transform accelerator may store in the secure partition of the internal memory. In instances in which a multiple data transform commands have common sensitive data, the transmission of the sensitive data may be performed once for the multiple data transform commands.

At block 406, the internal processor of the data transform accelerator may determine if the sensitive data obtained from the host device is storable within the secure partition of the internal memory of the data transform accelerator. In instances in which a sensitive data size (e.g., a first amount of memory) of the sensitive data is greater than a secure partition size (e.g., a second amount of memory) of the secure partition, the data transform accelerator may abort the data transform operations and/or may return an error to the host device, as illustrated in block 410. Alternatively, or additionally, in instances in which the sensitive data size is less than or equal to the secure partition size, the sensitive data may be stored in the secure partition.

At block 408, the host device may obtain the addresses from the data transform accelerator, where the addresses may be associated with the sensitive data stored in the secure partition. In some embodiments, in response to obtaining the addresses, the host device may remove the sensitive data from host memory.

At block 412, the host device may direct the data transform accelerator to reserve a portion of the internal memory (e.g., a portion of the secure partition) for intermediate data that may be generated during a data transformation operation. In some embodiments, the intermediate data may be sensitive data that be include limited access, such that the data transform accelerator may have access to the intermediate data and the host device may not have access to the intermediate data.

At block 414, the internal processor of the data transform accelerator may determine if the secure partition includes an amount of space (e.g., memory) to store the intermediate data that may be generated as part of the data transform operations. In instances in which the data transform accelerator determines the available memory of the secure partition is less than the intermediate data memory (e.g., an estimate of an amount of intermediate data memory), the data transform accelerator may abort the data transform operations and/or may return an error to the host device, as illustrated in block 410. In instances in which the data transform accelerator determines the available memory of the secure partition is greater than or equal to the estimate of the intermediate data memory, the method 400 may continue at block 416. In these and other embodiments, the amount of intermediate data memory may be an estimated value as the data transform operations that may generate the intermediate data may not be performed at the time the determination as to whether the available memory of the secure partition may be adequate for the intermediate data is made.

At block 416, the host device may obtain the intermediate data addresses from the data transform accelerator. The intermediate data addresses may be associated with the intermediate data that may be generated as part of a data transform operation and/or stored in the secure partition.

At block 418, the host device may generate input data and/or metadata associated with the input data that may be stored in one or more input buffers which may be used for data transform operations. In some embodiments, the host device may direct individual components of the input data and/or metadata to be stored in individual input buffers. For example, the input data may be stored in a first buffer, a first component of the metadata may be stored in a second buffer, a second component of the metadata may be stored in a third buffer, and so forth. In instances in which the metadata includes sensitive data, the sensitive data may be stored in an input buffer that may be located in the secure partition of the data transform accelerator memory.

In some embodiments, the host device may direct a portion of memory be reserved as an output buffer, which output buffer may be configured to store the output of the data transform operation. In some embodiments, the output buffer may be located in the host device memory. Alternatively, or additionally, the output buffer may be located in the data transform accelerator memory.

In these and other embodiments, the host device may generate one or more source descriptors that may point to the input buffers and/or one or more destination descriptors that may point to the output buffers. For example, the host device may generate a first set of source descriptors that point to the first input buffer, a second set of source descriptors that point to the second input buffer, etc., and the host device may generate a first set of destination descriptors that point to the output buffer, and a second set of destination descriptors that point to the intermediate buffer. In these and other embodiments, the source descriptors and/or the destination descriptors may be stored in the data transform command.

At block 420, the host device may update the addresses in the container. The updated addresses may include the addresses to the data transform command. Alternatively, or additionally, the updated addresses may point to the source descriptors and/or the destination descriptors, which may include the source descriptors associated with the sensitive data, and/or the destination descriptors associated with the intermediate data (e.g., the sensitive data generated during the data transform operation). Alternatively, or additionally, the host device may update the source descriptors and/or the destination descriptors using the addresses obtained from the data transform accelerator.

Modifications, additions, or omissions may be made to the method 400 without departing from the scope of the present disclosure. For example, the designations of different elements in the manner described is meant to help explain concepts described herein and is not limiting. Further, the method 400 may include any number of other elements or may be implemented within other systems or contexts than those described.

Figure 5:
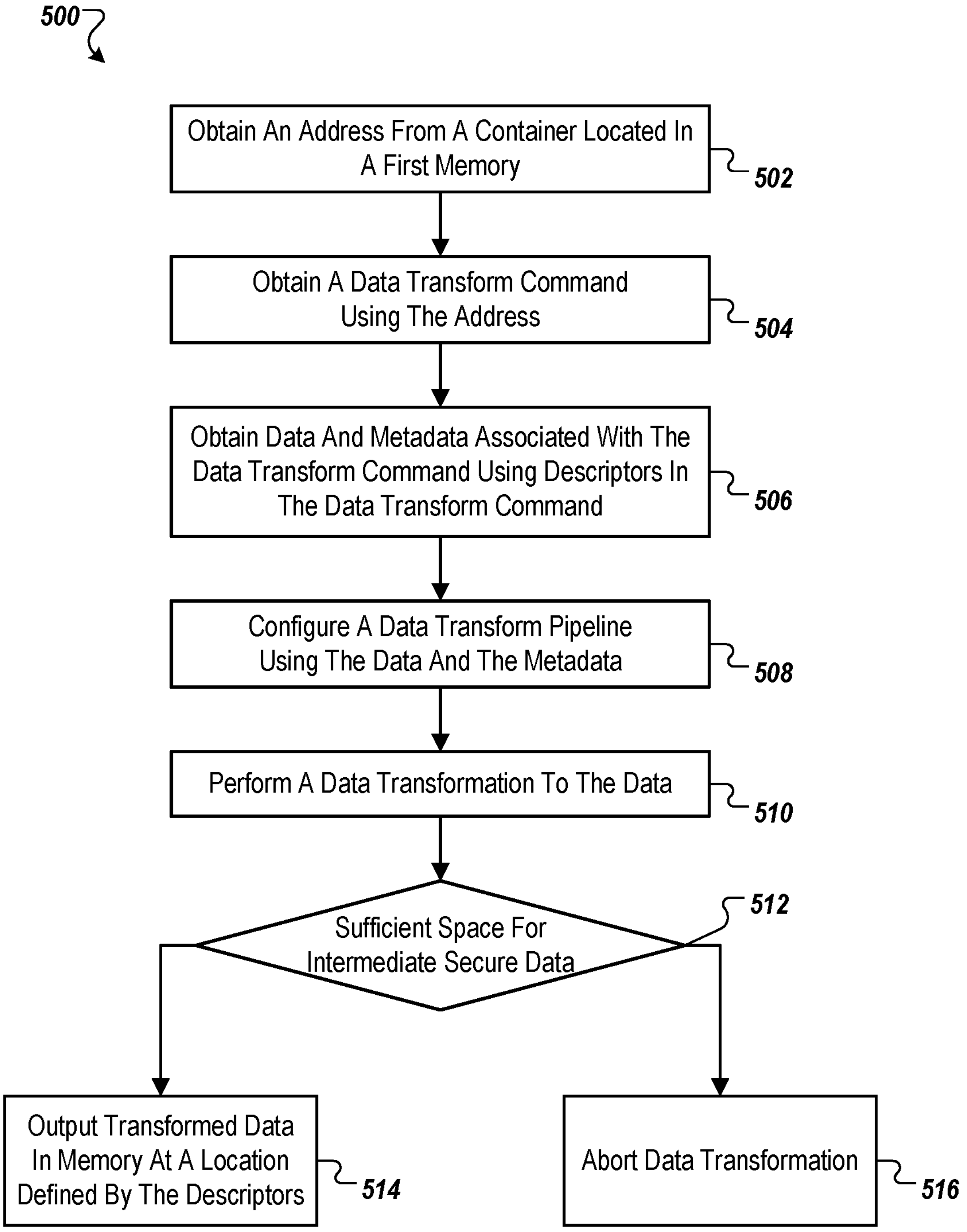
FIG. 5 illustrates a flowchart of an example method of a data transform accelerator performing secure processing of data.

FIG. 5 illustrates a flowchart of an example method 500 of a data transform accelerator performing secure processing of data, in accordance with at least one embodiment of the present disclosure. The method 500 may be performed by processing logic that may include hardware (circuitry, dedicated logic, etc.), software (such as is run on a general purpose computer system or a dedicated machine), or a combination of both, which processing logic may be included in any computer system or device such as the data transform accelerator 120 of FIG. 1.

At block 502, the data transform accelerator (e.g., the data transform accelerator 120 of FIG. 1) may obtain an address from an external device (e.g., the external device 110 of FIG. 1) using a data communication interface. The address may be located in a container that may be stored in memory on the external device. Alternatively, or additionally, the container may be stored in memory on the data transform accelerator. In these and other embodiments, the address may point to a data transform command that may include information and/or data that the data transform accelerator may use to perform data transform operations.

At block 504, the data transform accelerator may obtain the data transform command using the address obtained at block 502. In some embodiments, the data transform command may be stored in memory on the external device. Alternatively, or additionally, the data transform command may be stored in memory on the data transform accelerator. In these and other embodiments, the data transform command may include one or more source descriptors and/or one or more destination descriptors that may point to one or more input buffers and/or one or more output buffers, respectively.

At block 506, the data transform accelerator may obtain data and/or metadata from the input buffers associated with the data transform command by dereferencing the one or more source descriptors included in the data transform command. In some embodiments, the data may include metadata (e.g., that may include multiple components), where the metadata may include public data and/or sensitive data. For example, the data transform accelerator may obtain command metadata (e.g., that may be public data) from a first input buffer by dereferencing a first source descriptor in the data transform command, sensitive metadata from a second input buffer by dereferencing a second source descriptor in the data transform command, and so forth.

At block 508, the data transform accelerator may configure a data transform pipeline using the metadata (e.g., the public data and/or the sensitive data). The data transform pipeline may include an arrangement of data transform engines configured to perform a data transform operation based on the metadata.

At block 510, the data transform accelerator may obtain input data (e.g., data associated with the metadata) and the data transform accelerator may perform the data transform operations to the input data using the data transform pipeline. In some embodiments, during the data transform operation, intermediate data that may be sensitive data may be generated as part of the data transform operation.

At block 512, the data transform accelerator may determine whether a secure partition of the data transform accelerator memory includes space to store the intermediate data (e.g., determine whether the size of the secure partition is greater than or equal to the size of the intermediate data). In instances in which the amount of memory the intermediate data occupies is greater than the amount of memory in the secure partition, the data transform accelerator may abort the data transform operation and/or the data transform accelerator may not store the intermediate data, as illustrated in block 516. Alternatively, or additionally, the data transform accelerator may continue to perform the data transform operations (e.g., in instances in which the amount of memory the intermediate data occupies is less than the amount of memory in the secure partition).

At block 514, the data transform accelerator may output the output data generated by the data transform operation using the data transform pipeline to the one or more output buffers. In some embodiments, the data transform accelerator may direct the storage of the output data into the one or more outputs buffers by dereferencing the one or more destination descriptors included in the data transform command.

Modifications, additions, or omissions may be made to the method 500 without departing from the scope of the present disclosure. For example, the designations of different elements in the manner described is meant to help explain concepts described herein and is not limiting. Further, the method 500 may include any number of other elements or may be implemented within other systems or contexts than those described.

Figure 6:
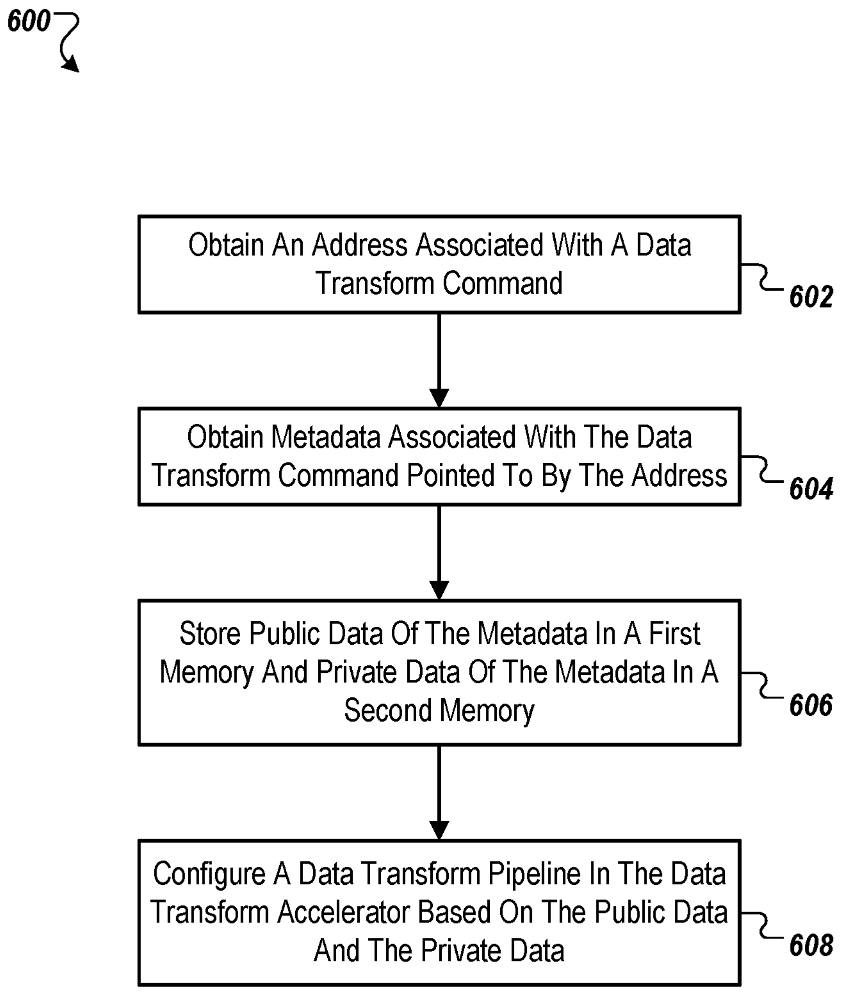
FIG. 6 illustrates a flowchart of an example method of secure processing in a data transform accelerator.

FIG. 6 illustrates a flowchart of an example method 600 of secure processing in a data transform accelerator, in accordance with at least one embodiment of the present disclosure. The method 600 may be performed by processing logic that may include hardware (circuitry, dedicated logic, etc.), software (such as is run on a general purpose computer system or a dedicated machine), or a combination of both, which processing logic may be included in any computer system or device such as the external device 110 and/or the data transform accelerator 120 of FIG. 1.

The method 600 may begin at block 602, where an address associated with a data transform command may be obtained. In some embodiments, the address may be disposed in a container that may be located in a first memory. In some embodiments, the first memory may be disposed in an external device relative to the data transform accelerator.

At block 604, metadata associated with the data transform command may be obtained. In some embodiments, the data transform command may be located in the first memory and/or the address may point to the data transform command. In some embodiments, a first portion of the metadata may be public data and a second portion of the metadata may be sensitive data.

In some embodiments, the first memory may be a first partition of a device memory and the second memory may be a second partition of the device memory. In some embodiments, the first partition and the second partition may be contiguous within the device memory.

At block 606, the public data may be stored in the first memory and the sensitive data may be stored in a second memory. In some embodiments, the second memory may be internal to the data transform accelerator. In some embodiments, the external device may be unable to access the sensitive data in the second memory.

In some embodiments, in instances in which the second portion of the metadata (e.g., the sensitive data) satisfies a threshold size relative to the second memory, an error may be generated. Alternatively, or additionally, in instances in which the second portion of the metadata satisfies the threshold size relative to the second memory, the second portion of the metadata may not be stored in the second memory.

At block 608, a data transform pipeline may be configured using the public data in the first memory and/or the sensitive data in the second memory. In some embodiments, software instructions may be received from the external device that may be associated with performing one or more data transform operations. In such instances, input data associated with a first descriptor that may be included in the container may be obtained. Alternatively, or additionally, one or more operations may be performed to the input data using the data transform pipeline. Alternatively, or additionally, results from the one or more operations may be output into an output buffer. In some embodiments, in instances in which the software instructions point to a buffer that is disposed in the second memory, an error may be generated and/or transmitted to the external device.

In some embodiments, the one or more operations may cause intermediate data to be generated by the data transform pipeline. In some embodiments, the intermediate data may be sensitive data. In such instances, the intermediate data may be stored in the second memory.

Modifications, additions, or omissions may be made to the method 600 without departing from the scope of the present disclosure. For example, the designations of different elements in the manner described is meant to help explain concepts described herein and is not limiting. Further, the method 600 may include any number of other elements or may be implemented within other systems or contexts than those described.

Figure 7:
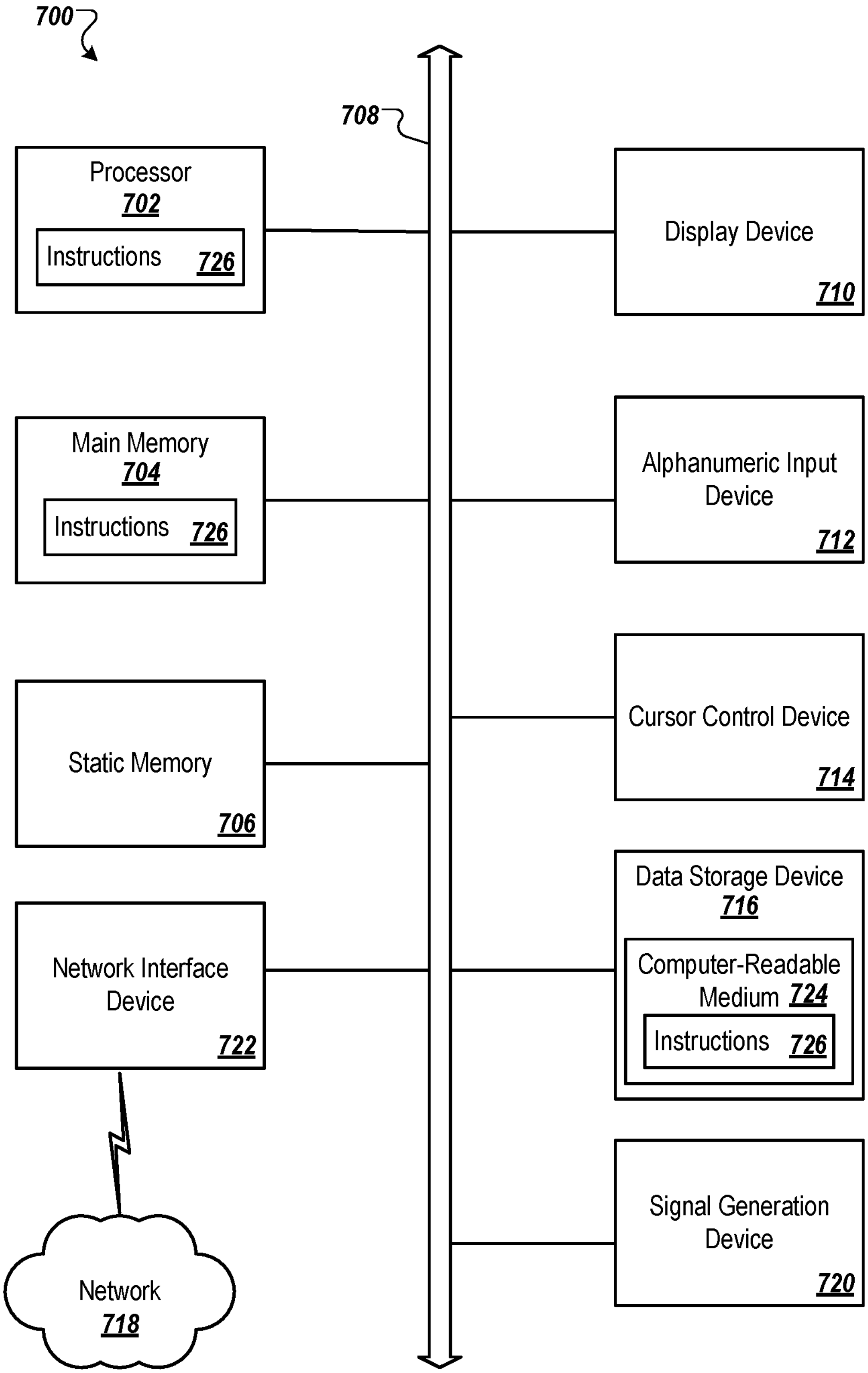
FIG. 7 illustrates an example computing device.

FIG. 7 illustrates an example computing device 700 within which a set of instructions, for causing the machine to perform any one or more of the methods discussed herein, may be executed. The computing device 700 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

The processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In at least one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method, comprising:

obtaining an address associated with a data transform command, the address disposed in a container located in a first memory;

obtaining metadata associated with the data transform command disposed in the first memory pointed to by the address, wherein a first portion of the metadata is public data and a second portion of the metadata is sensitive data;

storing the public data in the first memory and the sensitive data in a second memory, the second memory being disposed internally to a data transform accelerator; and configuring a data transform pipeline in the data transform accelerator based on the public data in the first memory and the sensitive data in the second memory.

2. The method of claim 1, wherein the first memory is disposed in an external device relative to the data transform accelerator.

3. The method of claim 1, wherein the first memory is a first partition of a device memory and the second memory is a second partition of the device memory and the first memory and the second memory are contiguous within the device memory.

4. The method of claim 1, wherein in response to the second portion of the metadata satisfying a threshold size relative to the second memory, generating an error and not storing the second portion of the metadata in the second memory.

5. The method of claim 1, further comprising in response to obtaining software instructions from an external device:

obtaining input data associated with a first descriptor included in the data transform command;

performing one or more operations to the input data using the data transform pipeline in the data transform accelerator in accordance with the first portion of the metadata and the second portion of the metadata; and outputting results from the one or more operations into an output buffer.

6. The method of claim 5, wherein the external device is unable to access the sensitive data in the second memory.

7. The method of claim 5, wherein the one or more operations generate intermediate data, and the intermediate data is stored in the second memory.

8. The method of claim 7, wherein the intermediate data is sensitive data.

9. The method of claim 5, further comprising in response to the software instructions pointing to a buffer disposed in the second memory, generating an error and transmitting the error to the external device.

10. A data transform accelerator comprising:

a memory having a first partition and a second partition; and one or more data transform engines configured to:

obtain an address disposed in a container in a second memory, the address being associated with a data transform command;

obtain data and associated metadata, including sensitive data and public data, associated with the data transform command;

direct the sensitive data to be stored in the first partition;

direct the public data to be stored in the second partition;

cause the one or more data transform engines to be arranged into a data transform pipeline based on the public data and the sensitive data; and direct the data to be transformed into transformed data using the data transform pipeline.

11. The data transform accelerator of claim 10, wherein the second memory is disposed external to the data transform accelerator.

12. The data transform accelerator of claim 10, wherein the first partition and the second partition are contiguous within the memory.

13. The data transform accelerator of claim 10, wherein the data transform command comprises one or more source descriptors indicating a memory location associated with the sensitive data and the public data.

14. The data transform accelerator of claim 10, wherein the data transform command comprises one or more destination descriptors to store the transformed data.

15. The data transform accelerator of claim 10, wherein in response to receiving a request from an external device to obtain the sensitive data from the first partition, the processor is further configured to:

restrict the external device from obtaining the sensitive data;

generate an error; and transmit the error to the external device.

16. The data transform accelerator of claim 10, wherein in response to obtaining the sensitive data associated with a data transform operation, the processor is further configured to compare a sensitive data size to a first partition size.

17. The data transform accelerator of claim 16, wherein in response to the sensitive data size being greater than the first partition size, the processor is further configured to:

abort the data transform operation; and transmit an error to an external device associated with the data transform operation.

18. The data transform accelerator of claim 10, wherein in response to intermediate data being generated in association with a data transform operation, the processor is further configured to compare an intermediate data size to a first partition size.

19. The data transform accelerator of claim 18, wherein in response to the intermediate data size being greater than the first partition size, the processor is further configured to:

abort the data transform operation; and transmit an error to an external device associated with the data transform operation.

20. The data transform accelerator of claim 18, wherein the intermediate data is sensitive data.

* * * * *